US009152602B2

(12) United States Patent
Lippincott et al.

(10) Patent No.: US 9,152,602 B2
(45) Date of Patent: *Oct. 6, 2015

(54) MECHANISMS FOR EVALUATING RELEVANCE OF INFORMATION TO A MANAGED DEVICE AND PERFORMING MANAGEMENT OPERATIONS USING A PSEUDO-AGENT

(75) Inventors: Lisa Ellen Lippincott, Berkeley, CA (US); Peter James Lincroft, Albany, CA (US); Peter Benjamin Loer, Oakland, CA (US); Jeremy Scott Spiegel, San Francisco, CA (US); Dennis Sidney Goodrow, Santa Rosa, CA (US); Gregory Mitchell Toto, Piedmont, CA (US)

(73) Assignee: International Business Machines Corporation, Armonk, NY (US)

( * ) Notice: Subject to any disclaimer, the term of this patent is extended or adjusted under 35 U.S.C. 154(b) by 450 days.

This patent is subject to a terminal disclaimer.

(21) Appl. No.: 13/448,264

(22) Filed: Apr. 16, 2012

(65) Prior Publication Data

US 2012/0203818 A1 Aug. 9, 2012

Related U.S. Application Data

(63) Continuation of application No. 12/044,614, filed on Mar. 7, 2008, now Pat. No. 8,161,149.

(60) Provisional application No. 60/893,528, filed on Mar. 7, 2007.

(51) Int. Cl.
*G06F 13/00* (2006.01)
*G06F 15/173* (2006.01)

(52) U.S. Cl.
CPC .................................. *G06F 15/173* (2013.01)

(58) Field of Classification Search
CPC .............. H04L 29/08072; H04L 29/06; H04L 29/08135; H04L 29/08648; H04L 29/08981; G06F 15/173
USPC .......................................................... 709/202
See application file for complete search history.

(56) References Cited

U.S. PATENT DOCUMENTS

| 5,010,571 A | 4/1991 | Katznelson et al. |
| 5,434,994 A | 7/1995 | Shaheen et al. |

(Continued)

FOREIGN PATENT DOCUMENTS

| JP | 2001318814 | 11/2001 |
| JP | 2002523841 | 7/2002 |

(Continued)

OTHER PUBLICATIONS

U.S. Appl. No. 12/044,614.

(Continued)

*Primary Examiner* — Robert B Harrell
(74) *Attorney, Agent, or Firm* — Stephen J. Walder, Jr.; Jeffrey S. LaBaw (57) ABSTRACT

A pseudo-agent is disclosed herein that bridges this divide. For purposes of the discussion herein, a pseudo-agent is a machine that is installed on a fully capable host machine, such as a Windows or UNIX machine, and that gathers and evaluates content from a management server, takes actions if so instructed, and reports the results of its evaluation upstream. However, unlike an agent in a traditional management system, which inspects and acts on the local machine, the pseudo-agent actually inspects and acts on a remote device, or many remote devices.

13 Claims, 5 Drawing Sheets

(56) References Cited

U.S. PATENT DOCUMENTS

| | | |
|---|---|---|
| 5,586,304 A | 12/1996 | Stupek, Jr. et al. |
| 5,649,099 A | 7/1997 | Theimer et al. |
| 5,732,137 A | 3/1998 | Aziz |
| 5,751,967 A | 5/1998 | Raab et al. |
| 5,958,050 A | 9/1999 | Griffin et al. |
| 6,123,737 A | 9/2000 | Sadowsky |
| 6,128,738 A | 10/2000 | Doyle et al. |
| 6,151,643 A | 11/2000 | Cheng et al. |
| 6,161,218 A | 12/2000 | Taylor |
| 6,192,404 B1 | 2/2001 | Hurst et al. |
| 6,233,449 B1 | 5/2001 | Glitho et al. |
| 6,233,612 B1 | 5/2001 | Fruchtman et al. |
| 6,237,144 B1 | 5/2001 | Delo |
| 6,240,394 B1 | 5/2001 | Uecker et al. |
| 6,240,451 B1 | 5/2001 | Campbell et al. |
| 6,256,664 B1 | 7/2001 | Donoho et al. |
| 6,256,668 B1 | 7/2001 | Slivka et al. |
| 6,263,362 B1 | 7/2001 | Donoho et al. |
| 6,289,394 B1 | 9/2001 | Kozuka |
| 6,289,510 B1 | 9/2001 | Nakajima |
| 6,321,258 B1 | 11/2001 | Stolfus et al. |
| 6,324,691 B1 | 11/2001 | Gazdik |
| 6,324,693 B1 | 11/2001 | Brodersen et al. |
| 6,327,617 B1 | 12/2001 | Fawcett |
| 6,330,715 B1 | 12/2001 | Razzaghe-Ashrefi |
| 6,345,386 B1 | 2/2002 | Delo |
| 6,347,396 B1 | 2/2002 | Gard |
| 6,347,398 B1 | 2/2002 | Parthasarathy et al. |
| 6,351,536 B1 | 2/2002 | Sasaki |
| 6,353,902 B1 | 3/2002 | Kulatunge et al. |
| 6,353,926 B1 | 3/2002 | Parthesarathy |
| 6,353,928 B1 | 3/2002 | Altberg et al. |
| 6,356,936 B1 | 3/2002 | Donoho et al. |
| 6,360,366 B1 | 3/2002 | Heath et al. |
| 6,363,524 B1 | 3/2002 | Loy |
| 6,378,128 B1 | 4/2002 | Edelstein et al. |
| 6,381,742 B2 | 4/2002 | Forbes et al. |
| 6,389,464 B1 | 5/2002 | Krishnamurthy et al. |
| 6,389,589 B1 | 5/2002 | Mishra et al. |
| 6,405,250 B1 | 6/2002 | Lin et al. |
| 6,407,988 B1 | 6/2002 | Agraharam et al. |
| 6,418,478 B1 | 7/2002 | Ignatius et al. |
| 6,418,554 B1 | 7/2002 | Dolo et al. |
| 6,449,642 B2 | 9/2002 | Bourke-Dunphy et al. |
| 6,460,175 B1 | 10/2002 | Ferri et al. |
| 6,477,703 B1 | 11/2002 | Smith et al. |
| 6,493,594 B1 | 12/2002 | Krami |
| 6,496,977 B1 | 12/2002 | Hamilton, II et al. |
| 6,516,316 B1 | 2/2003 | Ramasubramani et al. |
| 6,523,166 B1 | 2/2003 | Mishra et al. |
| 6,526,507 B1 | 2/2003 | Cromer et al. |
| 6,532,491 B1 | 3/2003 | Lakis et al. |
| 6,535,977 B1 | 3/2003 | Holle et al. |
| 6,557,054 B2 | 4/2003 | Reisman |
| 6,564,369 B1 | 5/2003 | Hove et al. |
| 6,571,186 B1 | 5/2003 | Ward |
| 6,574,537 B2 | 6/2003 | Kipersztok et al. |
| 6,594,692 B1 | 7/2003 | Reisman |
| 6,594,759 B1 | 7/2003 | Wong |
| 6,604,130 B2 | 8/2003 | Donoho et al. |
| 6,611,862 B2 | 8/2003 | Reisman |
| 6,622,146 B1 | 9/2003 | Sato et al. |
| 6,654,714 B1 | 11/2003 | Gentile et al. |
| 6,658,464 B2 | 12/2003 | Reisman |
| 6,658,489 B1 | 12/2003 | Asselin |
| 6,681,243 B1 | 1/2004 | Putzolu et al. |
| 6,725,242 B2 | 4/2004 | Gardner |
| 6,725,452 B1 | 4/2004 | Te'eni et al. |
| 6,735,766 B1 | 5/2004 | Chamberlain et al. |
| 6,745,224 B1 | 6/2004 | D'Souza et al. |
| 6,745,766 B2 | 6/2004 | Fini |
| 6,751,661 B1 | 6/2004 | Geddes et al. |
| 6,763,517 B2 | 7/2004 | Hines |
| 6,769,009 B1 | 7/2004 | Reisman |
| 6,789,255 B1 | 9/2004 | Pedrizetti et al. |
| 6,802,061 B1 | 10/2004 | Parthasarathy et al. |
| 6,804,663 B1 | 10/2004 | Dolo |
| 6,836,794 B1 | 12/2004 | Lucovsky et al. |
| 6,839,751 B1 | 1/2005 | Dietz et al. |
| 6,851,115 B1 | 2/2005 | Cheyer et al. |
| 6,871,281 B2 | 3/2005 | Schwab et al. |
| 6,904,457 B2 | 6/2005 | Goodman |
| 6,920,631 B2 | 7/2005 | Dolo |
| 6,922,831 B1 | 7/2005 | Kroening et al. |
| 6,931,434 B1 | 8/2005 | Donoho et al. |
| 6,941,453 B2 | 9/2005 | Rao |
| 6,954,790 B2 | 10/2005 | Forslow |
| 6,971,094 B1 | 11/2005 | Ly |
| 6,996,815 B2 | 2/2006 | Bourke-Dunphy et al. |
| 6,996,819 B1 | 2/2006 | Alanis |
| 7,134,019 B2 | 11/2006 | Shelest et al. |
| 7,137,040 B2 | 11/2006 | Bae et al. |
| 7,185,229 B2 | 2/2007 | Cromer et al. |
| 7,275,048 B2 | 9/2007 | Bigus et al. |
| 7,277,919 B1 | 10/2007 | Donoho et al. |
| 7,398,272 B2 | 7/2008 | Hindawi et al. |
| 7,523,190 B1 | 4/2009 | Bickerstaff et al. |
| 7,558,953 B2 | 7/2009 | Osthoff et al. |
| 7,620,816 B1 | 11/2009 | Vigue et al. |
| 7,668,938 B1 | 2/2010 | Phillips et al. |
| 7,962,610 B2 | 6/2011 | Lippincott et al. |
| 7,962,632 B2 | 6/2011 | Lipsanen |
| 8,055,617 B2 | 11/2011 | Hindawi et al. |
| 8,161,149 B2 | 4/2012 | Lippincott et al. |
| 8,171,364 B2 | 5/2012 | Veillette et al. |
| 8,495,157 B2 | 7/2013 | Goodrow et al. |
| 2001/0013008 A1 | 8/2001 | Waclawski |
| 2001/0032091 A1 | 10/2001 | Schultz et al. |
| 2001/0042104 A1 | 11/2001 | Donoho et al. |
| 2001/0048728 A1 | 12/2001 | Peng |
| 2002/0112200 A1 | 8/2002 | Hines |
| 2002/0147764 A1 | 10/2002 | Krupczak |
| 2002/0152384 A1 | 10/2002 | Shelest et al. |
| 2002/0188691 A1 | 12/2002 | Ignatius et al. |
| 2003/0033394 A1 | 2/2003 | Stine |
| 2003/0033396 A1 | 2/2003 | McCall |
| 2003/0033400 A1 | 2/2003 | Pawar et al. |
| 2003/0074321 A1 | 4/2003 | Peled |
| 2003/0074358 A1 | 4/2003 | Sarbaz et al. |
| 2003/0088542 A1 | 5/2003 | McGee et al. |
| 2003/0097454 A1 | 5/2003 | Yamakawa et al. |
| 2003/0126256 A1 | 7/2003 | Cruickshank et al. |
| 2003/0131252 A1 | 7/2003 | Barton |
| 2003/0187868 A1 | 10/2003 | Igarashi |
| 2003/0233645 A1 | 12/2003 | Cohen et al. |
| 2003/0233646 A1 | 12/2003 | Cohen et al. |
| 2004/0039816 A1 | 2/2004 | Bae et al. |
| 2004/0117275 A1 | 6/2004 | Billera |
| 2004/0174904 A1 | 9/2004 | Kim et al. |
| 2004/0187105 A1 | 9/2004 | Inada et al. |
| 2004/0213211 A1 | 10/2004 | Green et al. |
| 2004/0215781 A1 | 10/2004 | Pulsipher et al. |
| 2004/0230644 A1 | 11/2004 | Aratake et al. |
| 2004/0246975 A1 | 12/2004 | Joshi et al. |
| 2004/0255048 A1 | 12/2004 | Lev Ran et al. |
| 2004/0260949 A1 | 12/2004 | Aoki et al. |
| 2005/0002408 A1 | 1/2005 | Lee |
| 2005/0005026 A1 | 1/2005 | Brown et al. |
| 2005/0054327 A1 | 3/2005 | Johnston |
| 2005/0086477 A1 | 4/2005 | Lin et al. |
| 2005/0086534 A1 | 4/2005 | Hindawi et al. |
| 2005/0091501 A1 | 4/2005 | Osthoff et al. |
| 2005/0120160 A1 | 6/2005 | Plouffe et al. |
| 2006/0095388 A1 | 5/2006 | Brown et al. |
| 2006/0253446 A1 | 11/2006 | Leong et al. |
| 2007/0050645 A1 | 3/2007 | Siegmund |
| 2007/0204078 A1 | 8/2007 | Boccon-Gibod et al. |
| 2007/0288914 A1 | 12/2007 | Brannock et al. |
| 2008/0016335 A1 | 1/2008 | Takahashi et al. |
| 2008/0052054 A1 | 2/2008 | Beverina et al. |
| 2008/0192695 A1 | 8/2008 | Krishnan et al. |
| 2008/0201462 A1 | 8/2008 | Liss et al. |
| 2008/0222296 A1 | 9/2008 | Lippincott et al. |
| 2009/0019525 A1 | 1/2009 | Yu et al. |

(56) References Cited

U.S. PATENT DOCUMENTS

| | | | |
|---|---|---|---|
| 2010/0017494 | A1 | 1/2010 | Hindawi et al. |
| 2010/0228947 | A1 | 9/2010 | Sasao et al. |
| 2010/0332640 | A1 | 12/2010 | Goodrow et al. |
| 2011/0029626 | A1 | 2/2011 | Goodrow et al. |
| 2011/0066752 | A1 | 3/2011 | Lippincott et al. |
| 2011/0066841 | A1 | 3/2011 | Goodrow et al. |
| 2011/0066951 | A1 | 3/2011 | Ward et al. |
| 2011/0222691 | A1 | 9/2011 | Yamaguchi et al. |

FOREIGN PATENT DOCUMENTS

| | | |
|---|---|---|
| JP | 2002247033 | 8/2002 |
| JP | 2003076434 | 3/2003 |
| WO | WO03040944 | 5/2003 |

OTHER PUBLICATIONS

U.S. Appl. No. 12/044,775.
U.S. Appl. No. 12/044,790.
U.S. Appl. No. 12/881,668.
U.S. Appl. No. 12/882,106.
"High Availability Design", http://wiki.bigfix.com/index.php/High_Availability_Design, retrieved Jan. 29, 2008, 20 pages.
"Original High Availability Requirements", http://wiki.gigfix.com/index.php/Original_High_Availability_Requirements, retrieved Jan. 29, 2008, 2 pages.
APT Team, "Main Page of APT-GET", http://web.archive.org/web/20041027155110/http://linuxreviews.org/man/apt-get; Viewed Online Jul. 11, 2012, Mar. 12, 2001, 1-12.
Arnaud, et al., "How to Disable Security Warning Popup About Message Containing Script", http://forum.bigfix.com/viewtopic.php?id=1519; Accessed Online Jul. 12, 2012, Nov. 15, 2007, 2 Pages.
Bigfix, "New Features in BES 4.0", Available online: http://web.archive.org/web/20061026095436/http://support.bigfix.com/bes/changes_4_0.html, Oct. 26, 2006, 1 Page.
Bigfix, Inc., "BES Console Context Menu Wake-on LAN", http://web.archive.org/web/20061026092909/http://supporIbigfix.com/bes/misc/bes-wol.html; Archived Oct. 26, 2006, 1 page.
Bigfix, Inc., "BigFix Action Language Reference: A Guide to the BigFix Action Shell Commands for the BigFix Enterprise Suite (BES)", BigFix, Inc. Emeryville, CA. Compatiable with BES Version 6.0, Dec. 6, 2006, 59 Pages.
Bigfix, Inc., "BigFix Client ICMP Traffic Technical Details", http://support.bigfix.com/bes/misc/besclient_icmp.html; Version 5.1, 6.0. Accessed online Jun. 16, 2012, copyright 2011, 1-5.
Bigfix, Inc., "BigFix Enterprise Suite (BES) Administrator's Guide", BigFix, Inc. Emeryville, CA. Version 7.1, Jul. 25, 2008, 108 Pages.
Bigfix, Inc., "BigFix Enterprise Suite (BES) Console Operator's Guide", BigFix, Inc. Emeryville, CA. Version 7.1; last modified Jul. 26, 2008, copyright 2008, 182 Pages.
Bigfix, Inc., "BigFix Remote Desktop for Windows", Version 1.0. http://support.bigfix.com/product/documents/BigFixRemoteDesktopGuide-v1.pdf. Viewed online Jul. 11, 2012, Sep. 13, 2007, 13 pages.
Bigfix, Inc., "Wake on LAN With a Alteration", http://forum.bigfix.com/viewtopic.php?id=3248; Viewed online Jul. 11, 2012., May 14, 2009, 3 pages.
Burrows, Daniel "Modeling and Resolving Software Dependencies", Jun. 15, 2005, 1-16.

CISCO Systems, Inc., "Configuring the Cisco IOS DHCP Relay Agent", Cisco Systems, Inc. 170 West Tasman Drive, San Jose, CA 95134-1706, USA. First Published May 2, 2005, Nov. 17, 2006, 26 Pages.
CSTONEBA, "BES Deployment—Wake on Lan", retrieved on Aug. 1, 2012 online from url: http://forum.bigfix.com/viewtopic.php?pid=12542, Apr. 29, 2009, 4 pages.
Firstbrook, Peter et al., "Magic Quadrant for Endpoint Protection Platforms", Gartner, Inc., Dec. 21, 2007, 1-16.
Held, G et al., "The Internet Protocol and Related Protocols: Chapter 4", The ABCs of TCP/IP, Auerbach Publications, 2002, 56 Pages.
IBM, "Last Man Standing", http://www-01.ibm.com/support/docview.wss?uid=swg21506077; Accessed Online Aug. 1, 2012, 1-4.
Johnson, David B. et al., "DSR: The Dynamic Source Routing Protocol for Multi-Hop Wireless Ad Hoc Networks", http://www.monarch.cs.cmu.edu; Computer Science Department. Carnegie Mellon University, Pittsburgh, PA 15213-3891, 2001, 1-25.
Jreinec, et al., "Using a DOS Variable in Action Script", http://forum.bigfix.com/viewtopic.php?id=1867; Accessed online Jul. 12, 2012, Mar. 24, 2008, 1 Page.
Kessler, G et al., "An Overview of Cryptographic Methods", Network Design: Principles and Applications. Edited by Gilbert Held. Auerbach Publications, 2000, 679-691.
Knuth, Donald E. "The Art of Computer Programming", Second Edition. vol. 3: Sorting and Seaching. Addison Wesley Longman Publishing Co., Inc., Mar. 1998, 39 Pages.
Kus, Ben et al., "BigFix 7.1 Released", http://forum.bigfix.com/viewtopic.php?id=2258; Viewed Online Jul. 11, 2012., Aug. 5, 2008, 2 pages.
Leach, Paul J. et al., "CIFS/E Browser Protocol", Microsoft Internet Engineering Task Force. Network Working Group, Internet Draft, Jan. 10, 1997, 1-24.
Menezes, P et al., "Chapter 8: Public-Key Encryption", Handbook of Applied Cryptography. CRC Press, 1996, 37 Pages.
Mgoodnow, "Relay on the DMZ", http://forum.bigfix.com/viewtopic.php?id=428; Accessed Online Jul. 23, 2012, Nov. 30, 2006, 6 Pages.
Nholmes, et al., "BES Automatic Relay Settings", http://forum.bigfix.xom/viewtopic.php?id=182; Accessed Online Jul. 11, 2012., Sep. 18, 2006, 1-4.
OWASP, "Positive Security Model", Open Web Application Security Project (OWASP). http://web.archive.org/web/20060821235729/http://www.owasp.org/index.php/ Positive_security_model, Aug. 21, 2006, 2 Pages.
Tang, Hong et al., "Self-Organizing Networks of Communications and Computing", International Transactions on Systems Science and Applications, vol. 1, No. 4, Nov. 6, 2006, pp. 421-431.
Tipton, H et al., "Information Security Management Handbook: 2006 Edition", Auerbach Publications. Glossary, 2006, 179 Pages.
Todorov, Dobromir, "Chapter 1: User Identification and Authentication Concepts", From the book: Mechanics of User Identification and Authentication: Fundamentals of Identity Management. Auerback Publications. Takir & Francis Group, LLC., 2007, 1-64.
U.S. Department of Commerce, "Entity Authentication Using Public Key Cryptography", National Institute of Standards and Technology. Federal Information Processing Standards Publication. FIPS Pub 196., Feb. 18, 1997, 52 Pages.
Parker, Jr., D. S. et al., "Detection of Mutual Inconsistency in Distributed Systems", IEEE Transactions on Software Engineering, vol. SE-9, No. 3, May 1983, pp. 240-247.

MECHANISMS FOR EVALUATING RELEVANCE OF INFORMATION TO A MANAGED DEVICE AND PERFORMING MANAGEMENT OPERATIONS USING A PSEUDO-AGENT

CROSS REFERENCE TO RELATED APPLICATIONS

This application is a continuation of U.S. patent application Ser. No. 12/044,614, filed Mar. 7, 2008, which is currently allowed, which claims priority to U.S. patent application Ser. No. 60/893,528, filed Mar. 7, 2007, which application is incorporated herein in its entirety by this reference thereto.

BACKGROUND OF THE INVENTION

1. Technical Field

The invention relates to network architectures. More particularly, the invention relates to a pseudo-agent for use in connection with a network architecture.

2. Description of the Prior Art

Relevance based computing is disclosed, for example, in Donoho, D. et al, Relevance clause for computed relevance messaging, U.S. Pat. No. 7,277,919 (issued Oct. 2, 2007). In such system: "a collection of computers and associated communications infrastructure to offer a new communications process . . . allows information providers to broadcast information to a population of information consumers. The information may be targeted to those consumers who have a precisely formulated need for the information. This targeting may be based on information which is inaccessible to other communications protocols. The targeting also includes a time element. Information can be brought to the attention of the consumer precisely when it has become applicable, which may occur immediately upon receipt of the message, but may also occur long after the message arrives. The communications process may operate without intruding on consumers who do not exhibit the precisely-specified need for the information, and it may operate without compromising the security or privacy of the consumers who participate." (Abstract)

One network architecture that embodies such system is the BigFix Enterprise Suite™ (BigFix, Inc, Emeryville, Calif.), which brings devices in such system under management by installing a native agent on each device. For platforms on which this is feasible, this is considered to be the best method for monitoring and controlling devices. However, there are some platforms for which native agents are infeasible. For instance, network devices may be running proprietary OSs that are not designed to host third-party software. Other devices such as service kiosks or mobile devices may not have the resources available on the device to host a native agent. These platforms can typically be administered over some remotely accessible interface, and may in some cases be able to host limited third-party software.

It would be advantageous to bring such devices under the aegis of such a management system. It would also be advantageous to be able to administer these devices over various remote and network interfaces, yet maintain the distributed evaluation property of the agents in such management system.

SUMMARY OF THE INVENTION

An embodiment of the invention brings devices under the aegis of a distributed management system. An embodiment of the invention also makes it possible to administer these devices over various remote and network interfaces, yet maintain the distributed evaluation property of the clients in such management system. Accordingly, a pseudo-agent is disclosed herein that bridges this divide. For purposes of the discussion herein, a pseudo-agent is an agent that is installed on a fully capable host machine, such as a Windows or UNIX machine, and that gathers and evaluates content from a management server, takes actions if so instructed, and reports the results of its evaluation upstream. However, unlike an agent in a traditional management system, which inspects and acts on the local machine, the pseudo-agent actually inspects and acts on a remote device, or many remote devices.

BRIEF DESCRIPTION OF THE DRAWINGS

FIG. 5 is a block schematic diagram of a management system architecture which incorporates pseudo-agents, in which

DETAILED DESCRIPTION OF THE INVENTION

An embodiment of the invention brings devices under the aegis of a distributed management system. An embodiment of the invention also makes it possible to administer these devices over various remote and network interfaces, yet maintain the distributed evaluation property of the clients in such management system. Accordingly, a pseudo-agent is disclosed herein that bridges this divide. For purposes of the discussion herein, a pseudo-agent is an agent that is installed on a fully capable host machine, such as a Windows or UNIX machine, and that gathers and evaluates content from a management server, takes actions if so instructed, and reports the results of its evaluation upstream. However, unlike an agent in a traditional management system, which inspects and acts on the local machine, the pseudo-agent actually inspects and acts on a remote device, or many remote devices.

Architecture

Figure 1:
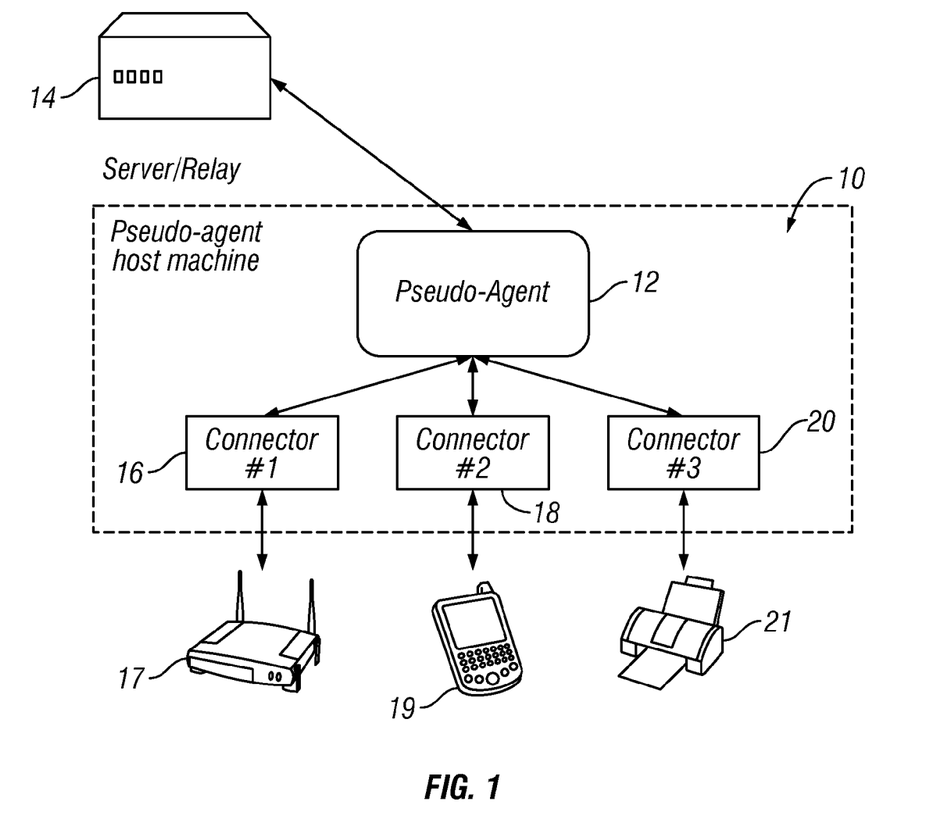
FIG. 1 is a block schematic diagram of a system architecture according to the invention.

FIG. 1 is a block schematic diagram of a system architecture according to the invention. In FIG. 1, a distributed management system provides a server/relay 14 in communication with a management console (not shown). The server/relay communicates with a pseudo-agent host machine 10 that incorporates a pseudo-agent 12 in accordance with the invention described herein. Through one or more connectors 16, 18, 20, the pseudo-agent interoperates with various corresponding devices that do not have the capability of supporting an agent themselves and/or that are prohibiting from hosting an agent, such as a critical device upon which software may never be installed, e.g. a medical device. Such devices include, for example and not by way of limitation, a wireless router 17, a Blackberry-type device 19, and a network printer 21.

Figure 2:
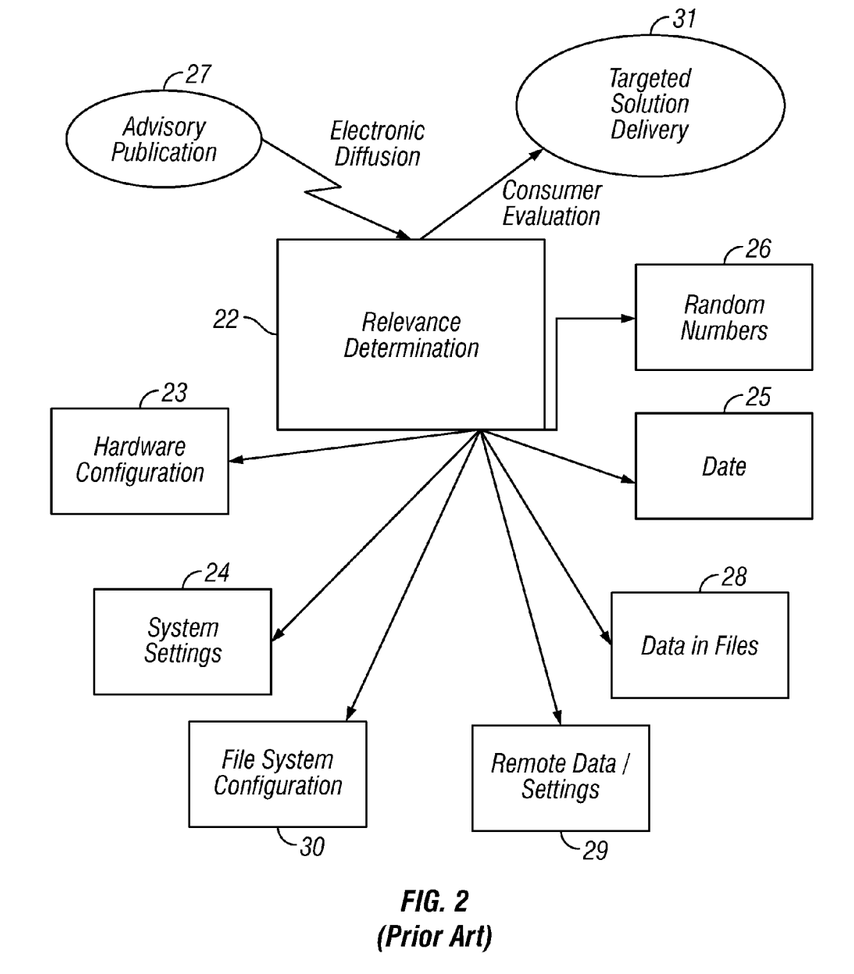
FIG. 2 is a block diagram showing an advisor viewpoint as described in U.S. Pat. No. 7,277,919.

Key to the invention is a management system architecture that comprises a management console function and one or more agents, in communication with the management console function, either directly or indirectly, and which perform a relevance determination function. Relevance determination (see FIG. 2), for example, for targeted solution delivery 31, is carried out by an applications program, referred to as the advice reader 22 which, in the prior art (see U.S. Pat. No. 7,277,919) runs on the consumer computer and may automatically evaluate relevance based on a potentially complex combination of conditions, including:

Hardware attributes. These are, for example, the type of computer on which the evaluation is performed, the type of hardware configuration 23, the capacity and uses of the hardware, the type of peripherals attached, and the attributes of peripherals.

Configuration attributes. These are, for example, values of settings for variables defined in the system configuration 30, the types of software applications installed, the version numbers and other attributes of the software, and other details of the software installation 24.

Database attributes. These are, for example, attributes of files 28 and databases on the computer where evaluation is performed, which may include existence, name, size, date of creation and modification, version, and contents.

Environmental attributes. These are, for example, attributes which can be determined after querying attached peripherals to learn the state of the environment in which the computer is located. Attributes may include results of thermal, acoustic, optical, geographic positioning, and other measuring devices.

Computed attributes. These are, for example, attributes which can be determined after appropriate computations based on knowledge of hardware, configuration, and database and environmental attributes, by applying specific mathematico-logical formulas, or specific computational algorithms.

Remote attributes 29. These are, for example, hardware, configuration, database, environmental, and computed attributes that are available by communicating with other computers having an affinity for the consumer or his computer.

Timeliness 25. These are, for example, attributes based on the current time, or a time which has elapsed since a key event, such as relevance evaluation or advice gathering.

Personal attributes. These are, for example, attributes about the human user(s) of the computer which can either be inferred by analysis of the hardware, the system configuration, the database attributes, the environmental attributes, the remote attributes, or else can be obtained by soliciting the information directly from the user(s) or their agents.

Randomization 26. These are, for example, attributes resulting from the application of random and pseudo-random number generators.

Advice Attributes 27. These are, for example, attributes describing the configuration of the invention and the existence of certain advisories or types of advisories in the pool of advice.

In this way, whatever information is actually on the consumer computer or reachable from the consumer computer may in principle be used to determine relevance. The information accessible in this way can be quite general, ranging from personal data to professional work product to the state of specific hardware devices. As a result, an extremely broad range of assertions can be made the subject of relevance determination. The invention herein extends this notion beyond a consumer computer to devices or logical structures that are physically or logically proximate to a consumer computer.

The pseudo-agent architecture has two layers: the pseudo-agent layer 12 (FIG. 1), which knows how to evaluate relevance and report on behalf of multiple machines, and the connector layer 16, 18, 20, which knows how to reach out across the network to inspect and possibly remediate a device, e.g. 17, 19, 21. The pseudo-agent layer is an element of a management system as embodied, for example, in the BigFix Enterprise Suite™. The connector layer may be implemented by a purveyor of such management systems and/or and by third parties. To this end, the interface to the connectors should be as simple as possible and should avoid assumptions about the implementation language. For example, the connectors preferably support arbitrary scripting implementations for quick connectors, and compiled implementations of more established connectors.

Pseudo-Agent Inspector Language

On a known management system agent, the relevance engine is continually calling inspectors as it evaluates relevance. This allows the output of one inspector to be passed into the next one, as in a clause such as:

a. names of files of folder "c:\"

However, in the pseudo-agent environment, it is not practical to query the remote device on such a frequent basis. Instead, the pseudo-agent must periodically connect to the remote device and send to it a batch of queries that have been collected from the relevance engine. To support this in an embodiment of the invention, all inspection of values on the remote device is done through an inspector of the following form:

a. remote device value "<value name>"

This inspector is preferably always parameterized with a string literal. It is preferably never allowed to feed the results of relevance evaluation into the inspector. This allows the relevance engine to collect all instances of this inspector, create a list of values to retrieve from the client, and retrieve one value for each unique value string.

Some examples of inspection that is performed by an embodiment of the invention using this mechanism include:

a. remote device value "os version"
b. remote device value "processor speed"
c. remote device value "version of file 'foo.exe'"

In an embodiment, there is also a set of built-in inspectors that is available for all remote devices. Some examples include:

a. type of remote device
b. last connect time of remote device
c. (etc.)

The examples above only allow for string return types. Other embodiments of the invention provide variations on the inspector for different return types.

Devices Administered

Pseudo-agents in accordance with the invention can be used to administer different device types, which fall into various broad categories.

Network Devices

Network devices, such as routers, printers, etc., are often administrable over network interfaces, but often do not have the capacity to host a third-party agent. In cases where they do have the capability to host a third-party agent, it may still be extremely unlikely that a system administrator would choose to install one.

Mobile Devices

Mobile devices, such as Windows Mobile, Palm, and RIM smart phones, do have some capacity to host third-party software, but they may be too resource-constrained to host a full management system agent. In these environments, much of the inspection work is pushed to a small, minimum footprint special-purpose piece of software on the device, but the pseudo-agent takes responsibility for gathering content, relevance evaluation, etc.

Exotic Operating System Devices

Agents can be maintained for many mainstream operating system distributions. However, some operating system versions of are not used widely enough to justify developing and maintaining a full agent. In such cases, these machines can be brought under management through the use of a pseudo-agent in accordance with the invention.

Monitoring and Control Devices

Devices such as process controllers, programmable logic controllers, machine tool controls, physical security devices, and other computer monitored or controlled equipment are often administrable over a remote or network interfaces, but often do not have the capacity to host a third-party agent. In some cases, remote access to the device may only be possible via very low or intermittent bandwidth connections Virtual Devices A device is not limited to a single object or even a collection of physical objects. A device could also be something virtual, such as a database process, as a collection of application software, e.g. a database, application server, and web server. It could also be an application spread across a several different machines (SAP for example).

Detailed Discussion

The pseudo-agent provides a set of functionality that allows management of devices that cannot support an agent on the device. Examples of such devices include network devices. The invention is also applied to virtual environments that do not actually correspond to physical systems, such as mobile phones and scanning devices, for example, as well as process controllers and other devices for which a fully functioning agent cannot be provisioned for various reasons, such as resource constraints of the device or security policies enforced by the organization that owns the device.

The pseudo-agent itself is thought of as a fully functioning agent that is responsible for the management of the device, as opposed to running the agent on the device. It is responsible for a hosting environment that takes the instructions from the management system infrastructure, plus information about the device by interacting with the device, and that extracts information about the device from the device and/or other systems in the network infrastructure. The pseudo-agent then provides a computational environment for evaluating a set of policies that exist in that management system infrastructure about those devices, combining it with the properties of the device, to decide, for example, whether or not the device is out of compliance, if the machine needs to be changed in some way, or just to monitor the state of the device and feed that information back up into a management system infrastructure that can be used to view as well as manage the device.

It should be noted that for purpose of the discussion herein, the device that is managed by the pseudo-agent is not just a physical object. It could be something virtual, such as a collection of software. It could also be an application spread across a several different machines, or a database running on a machine. It could also be a physical device of the kind discussed above. For purposes of the invention, such device is a logical object in the management system environment that can be assessed and managed. Accordingly, the device could encompass multiple devices, in multiple environments, that are cooperating to deliver some functionality, e.g. a database server plus an application server that both must be operational and configured together to deliver some functionality. This example comprises an environment that has access to the attributes of all the components therein and that can determine the relevance of policies surrounding the components in their entirety and how they are interacting with each other, as well as to reach out to those devices and reconfigure them.

One embodiment of the invention streams content created by outside sources into these environments and evaluates their relevance. The relevance flows back to the management console, where operators can then act on a set of relevant fixlets to manage those devices. Such operators can mediate various device states by sending out approved changes in the form of signed actions that the pseudo-agent can perform those on the device. Thus, there is a set of inspections. The pseudo-agent has an inspection abstraction for making measurements and it has an action abstraction for implementing changes.

The invention takes advantage of the observation that the closer one can get policy evaluation to the object against which one is enforcing policy the more current the visibility provided and the more effective the control that can be exerted. Key to the invention is to evaluate policy against an object that does not have an evaluation capability by use of a pseudo-agent and thus get policy enforcement as close to the device as possible. An embodiment of the invention provides a pseudo-agent nearby the device physically or logically in the network, where in a logical architecture the computational resources that are necessary to evaluate policy are close to the object against which the management system is trying to enforce policy.

By distributing the computation it is also possible to leverage potentially untapped resources around an enterprise or a large environment. Thus, processing resources close to a device are applied proximate to the device, rather than being centralized. Thus, the invention provides the ability to repurpose otherwise uncontrolled devices to perform additional functions by policy. In that use case that a particular device object is underutilized compared to similar objects in the environment, the pseudo-agent is used to reconfigure that set of objects such that it can handle a load and then provision that load to a new set of objects. Thus, some of the capabilities that must be in place for a policy to function properly exists in the environment, and these capabilities that are present in some objects are used to supervise other objects that can not have a policy object in them.

The pseudo-agent views properties of each one of those objects that it is managing. Viewing properties for purposes of the discussion herein means to interact with the device in a fashion that collects the actual properties from the device itself. There are various remote mechanisms that are supplied by various kinds of devices in the environment that allow one to inspect their property. Some of these mechanisms are remote API activation. Some of them look at other management infrastructure to obtain properties and devices. For example, network devices are often managed by a different infrastructure than that of the management system policy enforcement infrastructure. The pseudo-agent can interact with a database to extract how are these network devices are configured, as opposed to interacting with the network devices themselves. Thus, an embodiment of the invention provides for indirectly measuring the state of the devices by asking other infrastructure how is that device configured, how it is operating, what its operational characteristics are right now, whether it is under load, whether it is not under load, etc. This information can either be pulled to a management function or it can be collected on demand. In an embodiment of the invention, there are two different kinds of interactions to collect state information, either from a device directly or indirectly from another system to find out the operational state of the device or the object. The invention applies to either kind of use case where the polling has certain attributes of timing and network load and load on other components. It is necessary to store that state within the policy engine to evaluate future policies against that set of state information versus a real time ability to ask right now: "What's the state of this parameter?" and then feed that information directly into a policy engine. Both of these approaches have valid use cases and one chooses one or the other depending upon the characteristics of the environment, such as network load and other kinds of things. Once that set of policies is collected, or that set of instrumentation about the devices or objects that the management system is managing, then one can compare this information against the policies and evaluate the policies against such information to compute relevance and return that state to the management system.

This process can be performed directly, if log in credentials are available or there is otherwise the ability to configure the device, for example actual plug-ins that are capable of interacting with specific devices and that know how to manage the devices that fit into a plug-in architecture in the policy engine environment. The process knows how to collect the properties of the device. Another plug-in allows manipulation to change the device's parameters and change its operational characteristics so that it can be managed and/or changed. Such plug-in architecture allows the pseudo-agent to be used to extend the management system to new kinds of objects at any point time. It is thus possible to create new plug ins that facilitate the measurement and management of new kinds of objects.

For example, consider a situation where a person is in his office and has a cell phone. There is an office router and the person's assistant has another cell phone. There is a media center in the office and a satellite receiver with a recorder that is on the network as well. Thus, several devices locally and the location is a local office for a large law firm that has several offices. The head office is the management center and it establishes policies and uses a management system for dispersing these policies to all of the different locations for evaluation. One of the policies is a cell phone policy. One might be a media policy and so forth. There is also an electronic data discovery system to use in litigation for electronically collecting information from various places and assembling it for discovery purposes.

In this example, an IT manager deploys a pseudo-agent to the local environment, or many pseudo-agents that cooperate with each other to solve parts of the problem, and thus get visibility into different aspects of the set of problems that might be faced when trying to manage a diverse set of applications and devices in this environment. Some of the pseudo-agents are physical agents, e.g. real agents on an old device, and some of them are pseudo-agents because of limitations of the device. The pseudo-agents are configured to monitor the characteristics of the various devices within the environment. In the case of cell phones, they may be monitoring usage or emails to make sure that corporate policy around leaking information is not being violated. They could be managing virus scanners. They could be managing several different applications, deploying applications, discovering where applications are being used. They could also be giving visibility and manageability over database systems application software running in the environment that are designed around similar kinds of functionality, e.g. software license management, keeping software up to date surrounding policy enforcement. Security profiles of devices and applications also can prevent access by unauthorized personnel. The pseudo-agents themselves are configured to be responsible for collecting information, i.e. for devices that pertain to that set of use cases, to apply a set of policies against them to see whether they are in or out of compliance, and then apply a set of remediations against that set of devices, such that it manages them and keeps them in compliance.

In the case of cell phones, there are some classes of devices upon which agents can not be placed. In the spirit of keeping the policy engine as close to the device as possible, where it is not possible to put the agent on the device, a pseudo-agent is deployed into the environment that is responsible for providing visibility into the devices, where they are in the network. The policies must be in the pseudo-agent environment. They can not actually be on the device themselves. Thus, one is only able to manage the device when it is connected to a policy engine, but one can still have persistent historical state, e.g. "When was the device last checked in?" "What was its state against the set of known policies at the time?" It is also possible to have its characteristics at the time that it was last connected to compare against new policies as they come out. One can find out, for example, when it was last connected. Now, it is in violation. It needs to be patched. One can reach out and get that device connected as soon as possible so it can be managed.

In this example, there may be a dumb cell phone. An individual's desktop computer may not need all of the capacity it has for its main use. In addition to a physical agent, an agent is deployed that manages the desktop. A policy is designated that there is a pseudo-agent environment running on the desktop computer that is responsible for managing a cell phone. The cell phone has no ability, for example, for an external pseudo-agent to reach out across the network and query it, as there is no interface exposed by the cell phone that would support this. In this situation, the policy would deploy a nub, e.g. a little tiny piece of software, to the cell phone to report information, and thus provide support on the cell phone for inspection by the pseudo-agent. For example, the cell phone could wake up and send an e-mail to the pseudo-agent, reporting properties on a periodic basis, for example. That information could be a normal TCP/IP transaction. It could be some special protocol cell phones have, e.g. there is a transport where information would flow from the cell phone to the pseudo-agent and policy decisions would potentially be made in the pseudo-agent against the cell phone. There is no physical connection. There is some intervening transport. The pseudo-agent could also send a message back to the cell phone, e.g. using a short messaging service or some other kind of transport to provide configuration change on the cell phone.

If the cell phone has a remote API, then no software is required on the other end. Here, the pseudo-agent could initiate an interaction through the remote procedure call mechanism or some other transport mechanism that allows it to inspect remotely, properties of the cell phone and potentially, if it had security credentials, to remediate that cell phone.

In the example above of a discovery application, there is a database running on a machine in a local environment, a Web server if the discovery application is Web enabled, and several pieces of the application which may be running on different computers in the local office or that may be spread around several offices. The pseudo-agent environment is an execution environment against the above mentioned collection of applications and, based on the components of the discovery application, the pseudo-agent may also have a plug-in to allow it talk to a SQL server. It would also know how to interact remotely with a computer on which SQL server is running. It would also know how to talk to a variety of API's to the SQL server to collect information about its security and configuration, its load, etc. It may also look at properties of the machine on which SQL server is running, such as how the machine is configured. It may also through another plug-in have the ability to go and talk to a Window's Web server. Thus, in this example the pseudo-agent must know multiple different applications spanning multiple machines because, taken together, these different application environments represent collectively the discovery application's critical infrastructure. Accordingly, the pseudo-agent comprises a plug-in to the agent that gives the inspectors the ability to inspect and operate against each individual component of the discovery application regardless of where the components reside within the system. In this example, the pseudo-agent is located on a server or on a machine somewhere close in the network sense to the infrastructure that runs the various applications that make up the discovery application.

In this embodiment, there is a connector, which may interconnect with anything that the pseudo-agent can talk to, and that provides an interface to collect information through such plug-in architecture. Thus, the pseudo-agent is connected to each element of the system and the connectors present a unified interface to the execution environment so a policy language is consistent across the system. The connector then translates requests for information into whatever transport is required, e.g. via a device API or stub, on the device that is managed, and collects and provides that information in a consistent framework. Such interface via the connector may be to, for example but not limitation, SNMP or TCP action, where it is necessary to log in and run scripts against a remote machine to determine something; it could be a remote procedure call to a machine; it could be an email interaction, where the connector sends email, gets responses, parses the responses, and returns the information. All that is required is a transport and some language to make some interaction.

A key application of the invention is within the environment of a management system, as referenced above, which environment includes a management console, a policy, and an inspector, and in which rules are applied during a relevance evaluation on something. Key to the pseudo-agent is that the relevance evaluation is done on some system element, logical or physical, that is near to the relevance engine, but that it is done on something that is not itself able to support a relevance engine.

For purposes of the invention, one could define the relevance evaluation as occurring not just on a single object, as with a single cell phone or single database, but as occurring on different groups that comprise an object, so that the object could be data repository and an SQL database (as discussed above) or it could be in an oil platform, e.g. it could be a drill head controller and a pump manager. In these embodiments, interaction with the pseudo-agent, and therefore the management system, is through a connector that knows how to talk to, for example, the Web interface, via SSH, SNMP, or a proprietary protocol, but the execution environment of the pseudo-agent could be on any asset that can support it.

Further, the pseudo-agent is capable of running in the same environments that a physical agent. Thus, there may be a pseudo-agent on a machine that supports multiple agents and/or pseudo-agents if the resources are available, and even though that machine is also being managed by an agent associated with it.

Another important characteristic of the invention is that pseudo-agents can combine instrumentation from a variety of different sources and provide a framework for evaluating policy against a number of different environments. For example, there is a collection of servers with resident services comprising an enterprise application: Is the application configured according to policy and optimally given the resources available to its execution? There is a collection of process monitoring devices and process control devices comprising an assembly station in a manufacturing operation: Is the station configured properly and secured according to policy? There are policies with regard to a combination of these system elements: Are they configured properly to know about each other? What are the load characteristics against that set of devices? Should a new policy be deployed against a device to turn off something; to change its security aspects?

Figure 3:
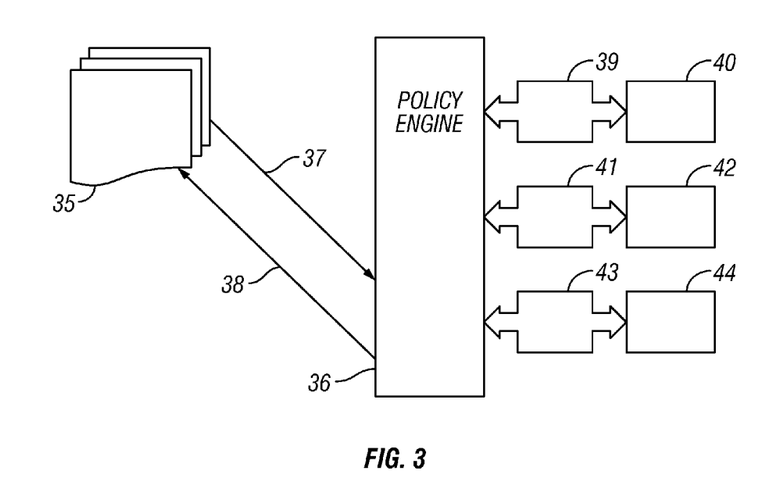
FIG. 3 is a block schematic diagram of a management system architecture which incorporates pseudo-agents according to the invention.

FIG. 3 is a block schematic diagram of a management system architecture which incorporates pseudo-agents according to the invention. In FIG. 3, a policy engine 36 receives information from a management console (not shown) in the form of fixlets, instrumentation policies, action policies, and the like 32; and provides reports 38 to the management console on managed devices and logical elements. The policy engine evaluates relevance, as discussed above and, responsive thereto, effects management of, for example, devices that are unable to support an agent, for example via a device plug-in 39 which instruments and remediates the device 40; a connector 41 to an application 42; and connectors 43 other logical or physical elements 42, for example via a plug-in.

Figure 4:
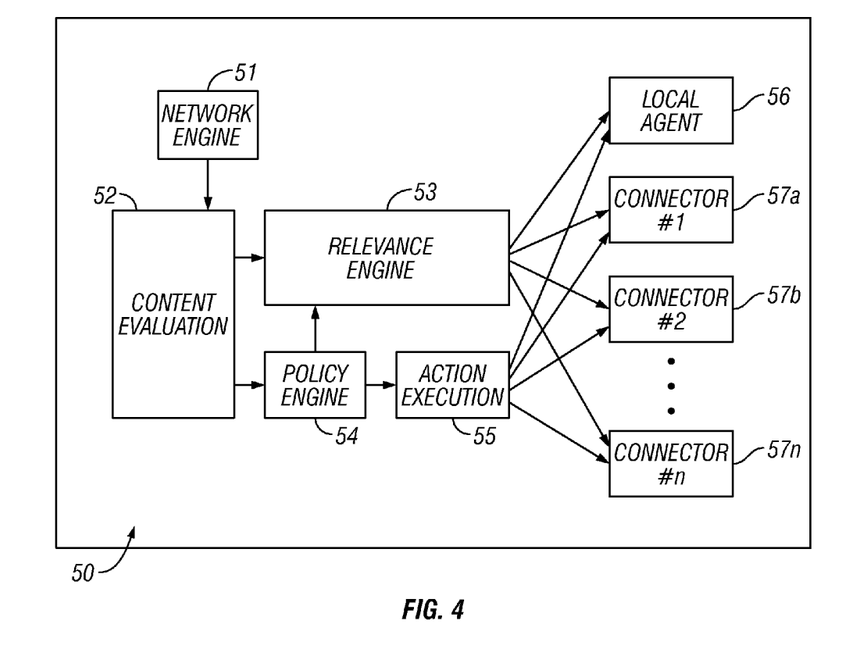
FIG. 4 is a block schematic diagram showing an agent architecture according to the invention.

FIG. 4 is a block schematic diagram showing an agent architecture according to the invention. In FIG. 4, the agent architecture 50 comprises a network engine 51 that operates in conjunction with a content evaluator 52 to iterate over all management objects. The content evaluator operates in conjunction with a relevance engine 53 (as discussed above) and a policy engine 54, which effects policy through an action execution element 55. Both the relevance engine and the action execution element cooperate in connection with a local agent inspection and remediation element 56. Key to the invention in this embodiment is the provision of a plurality of pseudo-agent connectors 57a-57n which are dynamically deployed and configured to manage and remediate devices and logical elements that can not themselves support an agent, as discussed above.

Figure 5A:
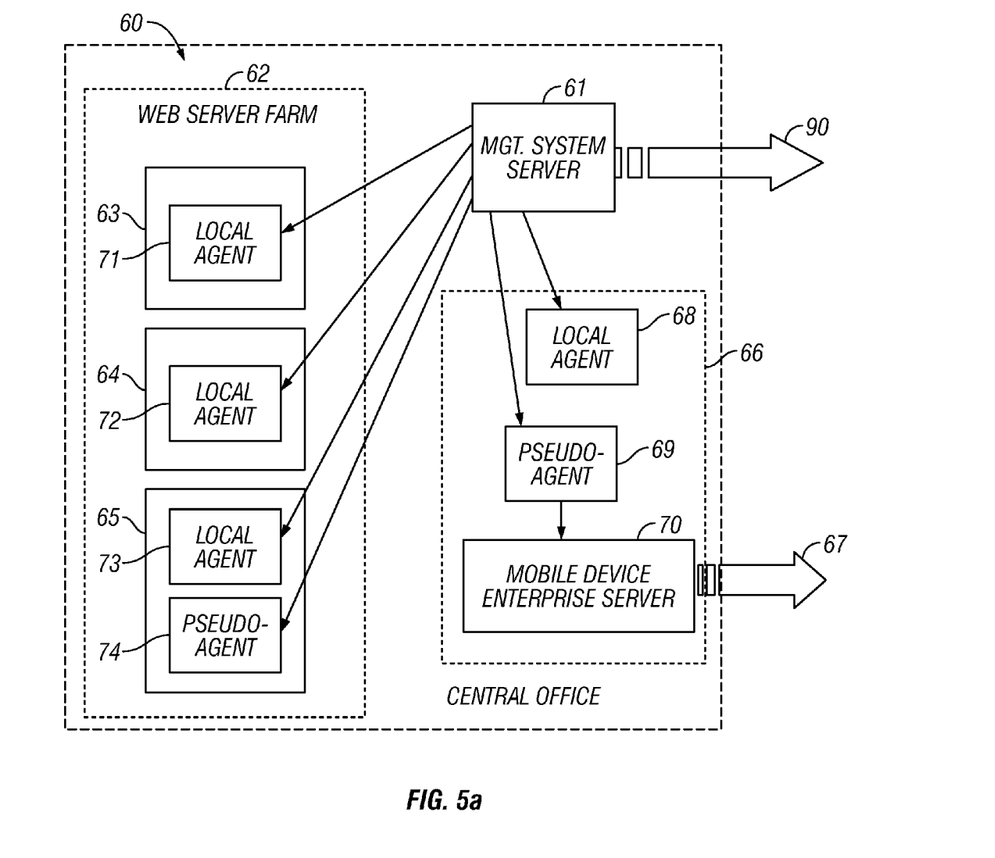
FIG. 5a shows a central office and FIG. 5b shows a local office, according to the invention.
Figure 5B:
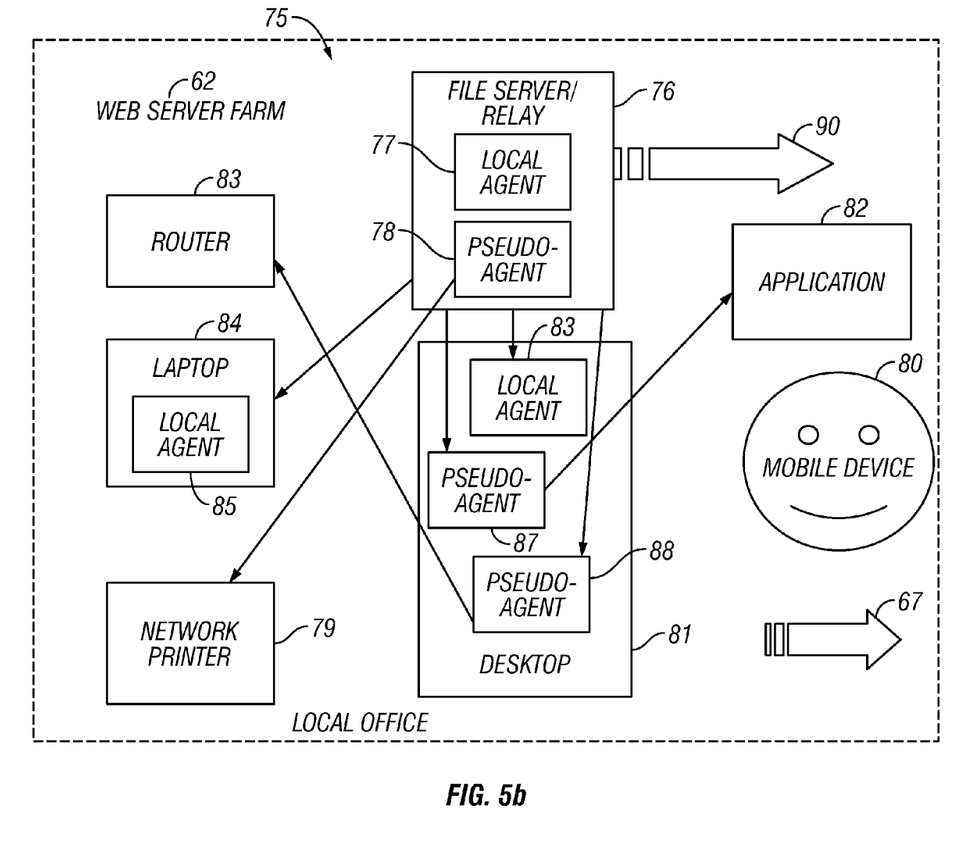

FIG. 5 is a block schematic diagram of a management system architecture which incorporates pseudo-agents, in which FIG. 5a shows a central office and FIG. 5b shows a local office, according to the invention. In the example of FIG. 5a, a central office 60 a management system server 61, which coordinates a web server farm 62 comprised of servers 63-65 via respective local agents 71-73. One server also supports a pseudo-agent 74 which operates as described herein.

A cell system server 66, coupled to a cell network 67, includes a local agent 68 which is responsive to the management system server and a pseudo-agent 69 which effects management and remediation of a mobile device enterprise management server 70. The mobile device enterprise management server is a device that can not be managed directly and that communicates with a set of devices. This embodiment of the invention deploys a server 66 that knows how to talk about the mobile devices. An IP network 90 extends the management system to one or more local offices 75 (FIG. 5b).

In this embodiment, there is a pseudo-agent that instantiates multiple policy calculations against each instance of the device that is reporting under the cell network infrastructure. Such system might have 1,000 mobile devices reporting in to a mobile device management server, and the pseudo-agent is enumerated across the 1,000 devices by talking to the mobile device management server to find out the operational characteristics of each one of the instances of the devices. Not only is the pseudo-agent capable of combining single instances of multiple data sources or managing a single external environment itself, but it is also capable of iterating over a number of instances of the same kind of device. In the case of the mobile device, for example, or an enterprise sales force, the pseudo-agent allows the management system to step through, manage, and remediate, the mobile devices one at a time.

In the local office 75 (FIG. 5*b*) there is a collection of real agents, for example in a file server/relay 76 (agent 77), a desktop computer 81 (agent 83), and a laptop computer 84 (agent 85). Pseudo-agents 77, 87, and 88 are deployed to manage each of the different devices in the local office. In this example, there is a router 83 that has a pseudo-agent 88. There is a pseudo-agent 78 for a network printer 79 on the file server 76. A mobile device 80 resides most of its time in the local office, but its logical presence is over the cell network 67 and it is in touch with the mobile enterprise server 70 back in the central office.

Another embodiment deploys pseudo-agents to perform asset discovery. For example, a policy says if the result of a local scan shows the presence of devices of a particular type, then deploy pseudo-agents to manage those devices. For example, if wireless access points are identified in a local network scan, then instantiate pseudo-agents to manage against those devices. The IT manager never actually pointed to any one of those devices, but merely created a policy that said, "Based on local information about an environment as a result of a discovery scan, go and assess those devices because they exist." This procedure could be run automatically or as the result of a network scan done by a local agent. For example, there are devices of this sort that are not on a current asset list, but that were discovered through a network scan. A pseudo-agent is then instantiated on the asset that begins, for example, to do a vulnerability scan, or monitor its network traffic by deploying a device that listens to it for policy compliance. All of these actions are defined a priori by policy. No administrative action is necessarily required to set up the environment. Thus, this aspect of the invention allows a management system to deploy one or more pseudo-agents upon the occurrence of certain cases within the policy.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An apparatus for managing at least one device that cannot host a management function, comprising:
   one or more processors;
   an entity to determine at least one device cannot host a management function;
   a pseudo-agent processor (pseudo-agent) installed on and executing in, in response to the determination, a host machine on a network, said device cannot host a management function;
   at least one connector in communication with said pseudo-agent for interoperating with said at least one device on behalf of said pseudo-agent, said at least one connector configured to inspect values on said at least one device;
   a management system for providing information to said pseudo-agent, said information comprising any of: management information, remediation information and policy enforcement information;
   said pseudo-agent configured for:
      evaluating said information;
      determining, in response to said evaluating, relevance of said information to said at least one device, based upon evaluation thereof, said pseudo-agent automatically determining relevance based on any of configuration attributes and personal attributes;
      taking, in response to said determining, one or more actions in connection with said at least one device, if so instructed by said management system via said information, based upon said relevance determination; and
      reporting results of said evaluation, relevance determination, and taking of one or more actions to said management system.

2. The apparatus of claim 1, said management system comprising:
   a server/relay;
   a management console; and
   a network for said server/relay to communicate with said pseudo-agent host machine.

3. The apparatus of claim 1, said pseudo-agent automatically determining relevance based on any of:
   hardware attributes;
   database attributes;
   environmental attributes;
   computed attributes;
   remote attributes;
   timeliness;
   randomization; and
   advice attributes.

4. The apparatus of claim 1, said pseudo-agent evaluating said information by automatically performing any of:
   mathematico-logical calculations;
   executing computational algorithms;
   returning results of system calls;
   accessing contents of said at least one device;
   querying said at least one device to evaluate any of:
      said properties of said at least one device;
      said at least one device's configuration;
      contents of storage devices associated with said at least one device;
      peripherals associated with said at least one device; and
      said at least one device's environment.

5. The apparatus of claim 1, said pseudo-agent comprising:
   a pseudo-agent layer for evaluating relevance and reporting on behalf of said at least one device; and
   a connector layer for remediating said at least one device.

6. The apparatus of claim 1, wherein said pseudo-agent periodically connects said at least one device and sends to it a batch of queries that have been collected from said management system.

7. The apparatus of claim 1, said pseudo-agent comprising:
   an inspector for inspection of values on said at least one device;
   wherein said inspector is parameterized with an argument and is not allowed to feed results of relevance evaluation into said inspector;
   wherein said management system collects all instances of the inspector, creates a list of values to retrieve from the pseudo-agent, and retrieves at least one value for each unique argument.

8. The apparatus of claim 7, wherein inspections performed by said inspector comprise inspecting any of:
   remote device operating system version;
   remote device processor properties; and
   remote device software and/or hardware version.

9. The apparatus of claim 7, said inspector comprising:
   a set of built-in inspectors that is available for each said at least one device, and which comprise any of:
   type of remote device; and
   last connect time of remote device.

10. The apparatus of claim 1, said at least one device comprising any of:
- network devices;
- mobile devices;
- exotic operating system devices;
- monitoring and control devices; and
- virtual devices.

11. The apparatus of claim 1, wherein said device is a logical element.

12. A computer implemented method for managing at least one device that cannot host a management function, comprising the steps of:
- providing one or more processors;
- determining, by an entity, at least one device that cannot host a management function;
- providing, in response to said determination, a pseudo-agent processor (pseudo-agent) installed on, and executing in, a host machine on a network;
- providing at least one connector in communication with said pseudo-agent for interoperating with said at least one device on behalf of said pseudo-agent, said at least one connector configured to inspect values on said at least one device;
- providing a management system for supplying information to said pseudo-agent, said information comprising any of: management information, remediation information, and policy enforcement information;
- said pseudo-agent further performing the steps of:
  - evaluating said information;
  - determining relevance of said information to said at least one device, based upon evaluation thereof, said pseudo-agent determining relevance based on any of configuration attributes and personal attributes;
  - taking one or more actions in connection with said at least one device, if so instructed by said management system via said information, based upon said relevance determination; and
  - reporting results of said evaluation, relevance determination, and taking of one or more actions to said management system.

13. A computer program product for managing at least one device that cannot host a management function, the computer program product comprising:
- a computer readable storage medium having computer readable program code embodied therewith, the computer readable program code comprising computer readable program code configured for:
  - determining, by an entity, at least one device that cannot host a management function;
  - providing, in response to said determination, a pseudo-agent processor (pseudo-agent) for installation on, and execution in, a host machine on a network;
  - providing at least one connector in communication with said pseudo-agent for interoperating with said at least one device on behalf of said pseudo-agent, said at least one connector configured to inspect values on said at least one device;
  - providing a management system for supplying information to said pseudo-agent, said information comprising any of: management information, remediation information, and policy enforcement information;
  - said pseudo-agent further performing the steps of:
    - evaluating said information;
    - determining relevance of said information to said at least one device, based upon evaluation thereof, said pseudo-agent determining relevance based on any of configuration attributes and personal attributes;
    - taking one or more actions in connection with said at least one device, if so instructed by said management system via said information, based upon said relevance determination; and
    - reporting results of said evaluation, relevance determination, and taking of one or more actions to said management system.

\* \* \* \* \*